United States Patent
Cortigiani et al.

(10) Patent No.: US 9,781,788 B1
(45) Date of Patent: Oct. 3, 2017

(54) REDUCING POWER DISSIPATION IN DRIVER CIRCUITS

(71) Applicant: Infineon Technologies AG, Neubiberg (DE)

(72) Inventors: Fabrizio Cortigiani, Padua (IT); Andrea Logiudice, Padua (IT); Maurizio Galvano, Padua (IT); Marco Pamato, Schio (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/087,062

(22) Filed: Mar. 31, 2016

(51) Int. Cl.
| | | |
|---|---|---|
| *H05B 33/00* | (2006.01) | |
| *H05B 33/08* | (2006.01) | |
| *H02M 3/156* | (2006.01) | |
| *H02M 1/08* | (2006.01) | |

(52) U.S. Cl.
CPC ......... *H05B 33/0815* (2013.01); *H02M 1/08* (2013.01); *H02M 3/156* (2013.01)

(58) Field of Classification Search
CPC ............. H03K 17/0822; H03K 17/163; H03K 2017/0806; H03K 17/063; H03K 17/24; H03K 17/687; H03K 19/017509; H03K 19/01759; H03K 2217/0081; H03K 17/0828; H03K 7/08; H05B 33/0815; H05B 33/0818
See application file for complete search history.

(56) References Cited

U.S. PATENT DOCUMENTS

| | | |
|---|---|---|
| 8,400,081 B2 | 3/2013 | Catalano et al. |
| 8,963,431 B2 | 2/2015 | van den Berg et al. |
| 2007/0188425 A1* | 8/2007 | Saccomanno ........ G09G 3/3406 345/82 |
| 2011/0199003 A1 | 8/2011 | Muguruma et al. |
| 2013/0127353 A1* | 5/2013 | Athalye ............ H05B 33/0815 315/193 |
| 2013/0257279 A1 | 10/2013 | Le |

FOREIGN PATENT DOCUMENTS

WO       2012063141 A1      5/2012

OTHER PUBLICATIONS

"Infineon® LITIX™ Basic Driver Family, Multichannel Solutions for N-1, Open Load & Short Circuit Detection," Infineon, Application Note, Automotive Power, V1.1, Mar. 27, 2015, 65 pp.

* cited by examiner

*Primary Examiner* — Monica C King
(74) *Attorney, Agent, or Firm* — Shumaker & Sieffert, P.A.

(57) ABSTRACT

In one example, a method includes generating, by a current source of a device, a first portion of a power signal that drives one or more load elements. In this example, a second portion of the power signal is generated by one or more components that are external to the device and are in parallel to the current source such that the second portion of the power signal does not flow through the current source.

19 Claims, 10 Drawing Sheets

REDUCING POWER DISSIPATION IN DRIVER CIRCUITS

TECHNICAL FIELD

This disclosure relates to reducing the amount of power dissipated in driver circuits, and in particular, to using one or more low-cost components to reduce the amount of power dissipated in driver circuits.

BACKGROUND

Driver circuits may be used to control the amount of power provided to loads from power sources. In operation, a driver circuit may dissipate an amount of power that is proportional to the voltage across the driver circuit and the current flowing through the driver circuit. In some examples, such power dissipation may cause a driver circuit to overheat, which may negatively impact the functionality of the driver circuit. As such, in some examples, it may be desirable to reduce the amount of power dissipated by driver circuits.

SUMMARY

In general, this disclosure is directed to reducing the amount of power dissipated in driver circuits. For example, a system may include one or more external components in parallel with a current source of a driver device to reduce amount of power dissipated in the driver device.

As one example, a method includes generating, by a current source of a device, a first portion of a power signal that drives one or more load elements, wherein a second portion of the power signal is generated by one or more components that are external to the device and are in parallel to the current source such that the second portion of the power signal does not flow through the current source.

As another example, a driver device includes a current source configured to generate a first portion of a power signal that drives one or more load elements, wherein a second portion of the power signal is generated by one or more components that are external to the device and are in parallel to the current source such that the second portion of the power signal does not flow through the current source.

As another example, a driver device includes means for generating a first portion of a power signal that drives one or more load elements, wherein a second portion of the power signal is generated by one or more components that are external to the device and are in parallel to the current source such that the second portion of the power signal does not flow through the current source; and means for outputting the first portion of the power signal.

The details of one or more examples of the disclosure are set forth in the accompanying drawings and the description below. Other features, objects, and advantages will be apparent from the description and drawings, and from the claims.

DETAILED ABSTRACT OF THE INVENTION

Figure 1:
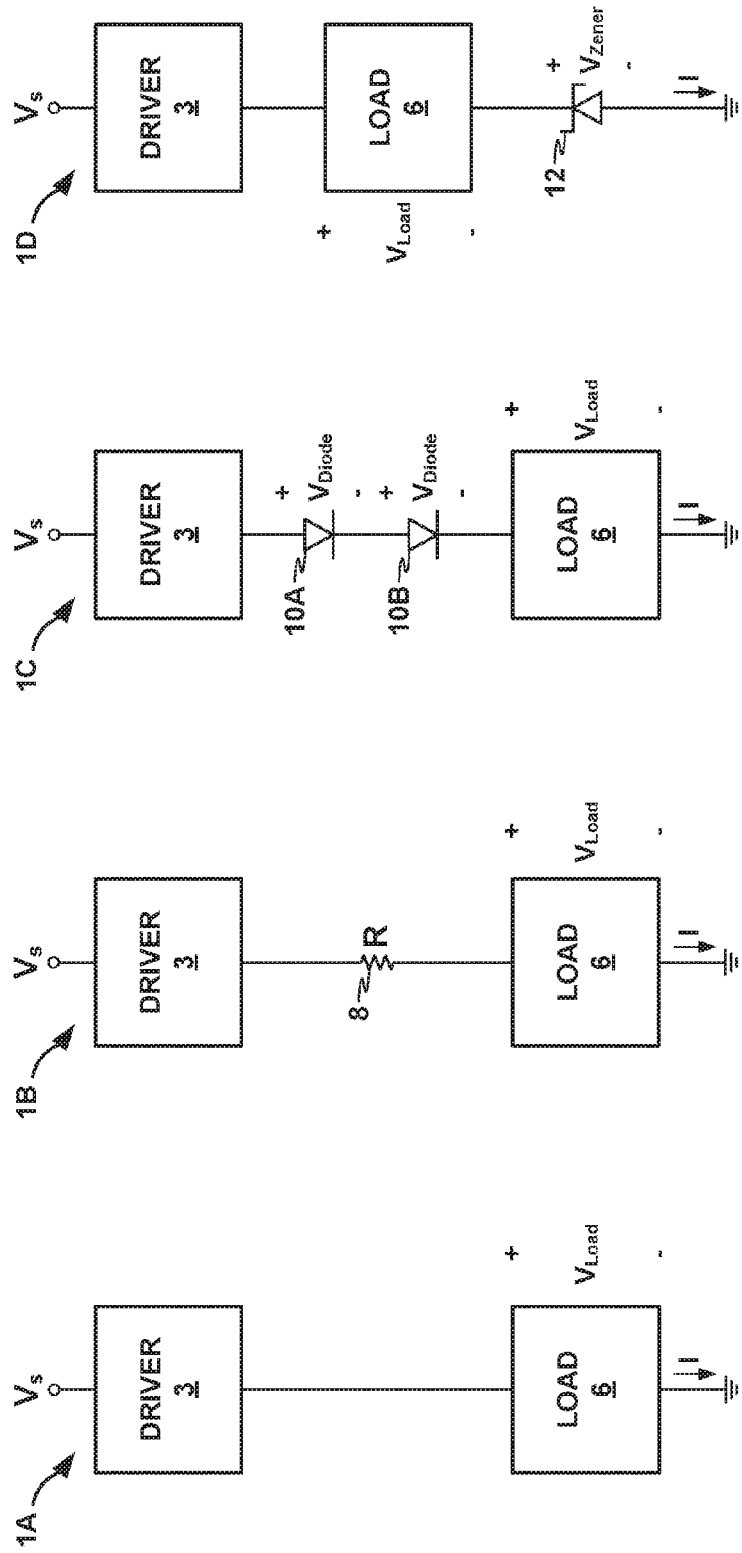
FIGS. 1A-1D are a conceptual diagrams illustrating example systems that each include a driver device configured to drive a load with a power signal, in accordance with one or more exemplary techniques of this disclosure.

In general, this disclosure is directed to reducing the amount of power dissipated in driver circuits. As discussed above, driver circuits may control the amount of power provided to loads from power sources. In some examples, the power source may be a variable power source, such as a battery with an operating voltage range of 8 volts (V) to 18V. As the power dissipated by a driver circuit increases in proportion to the voltage across the driver circuit and excess power dissipation may negatively impact the functionality of the driver circuit, it may be desirable for the driver circuit to be able to dissipate the "worst case" amount of power without negatively impacting the functionality of the driver circuit. In some examples, the functionality of the driver circuit may be negatively impacted if the power dissipated by the driver circuit causes a temperature of the driver circuit (e.g., a junction temperature) to exceed a threshold (e.g., 50° C., 100° C., 150° C., 200° C.).

In some examples, the amount of power dissipated in a driver circuit may be reduced through the use of a ballast regulator in which power is distributed in a series element and regulated via a loop. In some examples, the stability of the regulation loop in such a circuit may have the same characteristics and drawbacks as a low-drop out voltage regulator. In some examples, external transistors may also be used in the regulation loop.

In other examples, the amount of power dissipated in a driver circuit may be reduced through the use of a DC/DC regulator. For instance, an external DC/DC regulator, which may be electrically positioned between the variable power source and the driver circuit, may generate a continuous supply voltage from the variable power source and the driver circuit may use the generated continuous supply voltage to provide power to a load. In operation, the DC/DC regulator may reduce the amount of power dissipated in a driver circuit by preventing the supply voltage from reaching the "worst case" level.

In other examples, the amount of power dissipated in a driver circuit may be reduced through the use of one or more passive components in series with the load. For instance, one or more resistors and/or one or more diodes may be placed in series with the load. In operation, the one or more passive components may reduce the amount of power dissipated in a driver circuit by reducing the voltage drop across the driver circuit.

In other examples, the amount of power dissipated in a driver circuit may be reduced through the use of one or more additional driver circuits in parallel with the driver circuit. In operation, the use of one or more additional driver circuits in parallel with the driver circuit may reduce the amount of power dissipated in a driver circuit by reducing the current level flowing through the driver circuit in proportion to the number of additional driver circuits used. For example, if one additional driver circuit is used, the amount of power dissipated in the driver circuit may be reduced by half.

In some examples, the above techniques for reducing power dissipation may present one or more disadvantages. As one example, the above techniques may be not be cost effective in that additional active components may be needed to handle "worst case" power distribution which may result in a cost adder that may be proportional to the extra power needed. As another example, the above techniques may require extra design effort in that more design work may be needed, especially for the ballast solutions, to consider topics such as stability and performance at low battery level which may depend from load characteristics (e.g. total output current, harness on the output network, etc.).

In accordance with one or more techniques of this disclosure, one or more external components may be placed in parallel with a driver device to reduce amount of power dissipated in the driver device. As one example, one or more resistors and one or more switches may be placed in parallel with a current source of a driver device. In operation, a current source of the driver device may generate a first portion of a power signal with a first current level and the one or more external components may generate a second portion of the power signal with a second current level. The first portion of the power signal and the second portion of the power signal may be combined to form the power signal (which may have a current level equal to the first current level and the second current level) that is used to drive one or more load elements. By placing the one or more external components in parallel with the current source of the driver device, the amount of current flowing through the driver device may be reduced without reducing the amount of current provided to the one or more load elements. As discussed above, the amount of power dissipated by a driver device is proportional to the amount of current flowing through the driver device. Therefore, by placing the one or more external components in parallel with the current source of the driver device, the amount of power dissipated by the driver may be reduced without reducing the amount of current provided to the one or more load elements.

As discussed above, in some examples, the power source that supplies the driver circuit may be a variable power source, such as a battery with an operating voltage range of 8V to 18V. In some examples, the current level of the second portion of the power signal generated by the one or more external components may be proportional to the voltage of the power source. For instance, the current level of the second portion of the power signal generated by the one or more external components may increase as the voltage of the power source increases. However, in some examples, it may be desirable for the current level of the overall power signal (the combined first portion and second portion) to be independent of the voltage of the power source.

In accordance with one or more techniques of this disclosure, a driver device placed in parallel with one or more external components configured to reduce amount of power dissipated in the driver device may be configured to adjust the current level of the first portion of the power signal such that the current level of the overall power signal is independent of the voltage of the power source. For instance, the driver device may adjust the amount of current provided by a current source included in the driver device based on the current level of the second portion of the power signal that is generated by the one or more external components In some examples, it may be desirable to selectively activate/deactivate the load driven by the power signal. For instance, where the load includes one or more light emitting diodes (LEDs), it may be desirable to turn the LEDs on and off. As one example, the load driven by the power signal may be activated/deactivated by activating/deactivating the power source that supplies the driver device. As another example, the load driven by the power signal may be activated/deactivated by decoupling the power source that supplies the driver device from the driver device. However, in some examples, it may be desirable to selectively activate/deactivate the load driven by the power signal without deactivating the driver device.

In accordance with one or more techniques of this disclosure, a driver device may be configured to selectively activate/deactivate the load driven by the power signal while still receiving power from a power source. For instance, a driver device may selectively cause a current source of the driver device to cease generating the first portion of the power signal and cause the one or more components to cease generating the second portion of the power signal. In some examples, a driver device may be configured to selectively activate/deactivate the load driven by the power signal based on a control signal received from an external device, such as a microcontroller.

FIGS. 1A-1D are a conceptual diagrams illustrating example systems that each include a driver device configured to drive a load with a power signal, in accordance with one or more exemplary techniques of this disclosure. As illustrated in FIGS. 1A-1D, each of systems 1A-1D includes a driver device 3 configured to drive a load 6 with a power signal.

In some examples, systems 1A-1D may include a load 6, which may be configured to receive power from driver device 3. In some examples, load 6 may include one or more light emitting devices (e.g., one or more light bulbs, one or more light emitting diodes (LEDs), one or more laser diodes, and the like), one or more batteries, one or more computing devices, one or more resistive devices, one or more capacitive devices, one or more inductive devices, any other device that uses electrical power, or any combination of the same. In one specific example, load 6 may include one or more LEDs located on an automobile (e.g., headlights, fowlights, tail-lights, reverse lights, brake lights, turn signals, and the like). As illustrated in FIGS. 1A-1D, load 6 may be connected such that driver device 3 may be a high-side driver with respect to load 6.

In some examples, systems 1A-1D may include a driver device 3, which may be configured to control the amount of power provided to loads from power sources. For instance, driver device 3 may control the amount of power provided to load 6 from a power source that supplies power signal $V_s$. In some examples, the power source may be a variable power source, such as a battery that supplies power signal $V_s$ in a voltage range of 8V to 18V. As the power dissipated by driver device 3 increases in proportion to the voltage across driver device 3 and excess power dissipation may negatively impact the functionality of driver device 3, it may be desirable for driver device 3 to be able to dissipate the "worst case" amount of power without negatively impacting the functionality of driver device 3. In the example of FIG. 1A, the power dissipated by driver 3 may be determined in accordance with Equation (1), below.

$$P=(V_s-V_{Load})*I \qquad (1)$$

As discussed above, it may be desirable to reduce the amount of power dissipated in driver circuits, such as driver device 3 (e.g., to reduce the amount of power dissipated by the driver circuit in the "worst case"). In accordance with one or more techniques of this disclosure and as shown in FIGS. 1B-1D, the amount of power dissipated in driver device 3 may be reduced through the use of one or more passive components in series with load 6. In the example of FIG. 1B, the amount of power dissipated in driver device 3 may be reduced through the use of resistor 8 in series with load 6. The power dissipated by driver 3 in the example of FIG. 1B may be determined in accordance with Equation (2), below.

$$P=(V_s-R*I-V_{Load})*I \qquad (2)$$

In the example of FIG. 1C, the amount of power dissipated in driver device 3 may be reduced through the use of diodes 10A and 10B in series with load 6. The power dissipated by driver 3 in the example of FIG. 1C may be determined in accordance with Equation (3), below.

$$P=(V_s-2*V_{Diode}-V_{Load})*I \qquad (3)$$

In the example of FIG. 1D, the amount of power dissipated in driver device 3 may be reduced through the use of zener diode 12 in series with load 6. The power dissipated by driver 3 in the example of FIG. 1D may be determined in accordance with Equation (4), below.

$$P=(V_s-V_{Zener}-V_{Load})*I \qquad (4)$$

As can be seen from Equations (1)-(4), the amount of power dissipated in driver device 3 may be reduced through the use of one or more passive components in series with load 6. However, in some examples, it may not be desirable to use one or more passive components in series with load 6 to reduce the amount of power dissipated in driver device 3.

Figure 2:
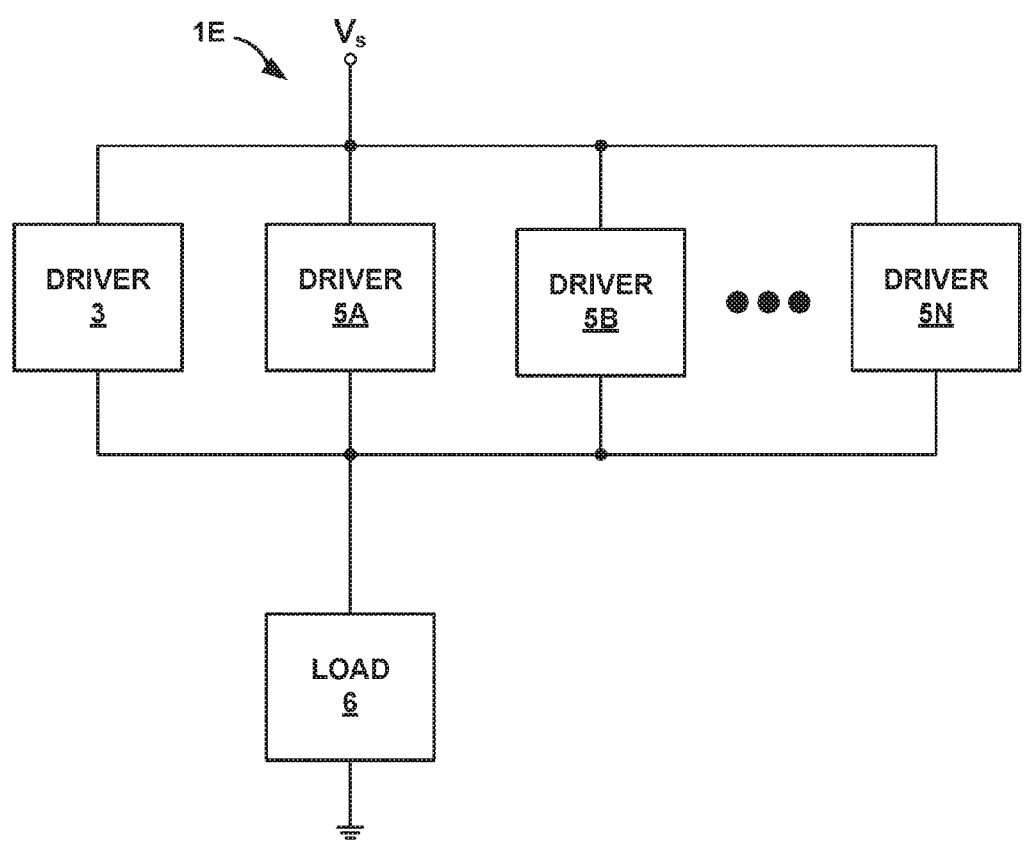
FIG. 2 is a conceptual diagram illustrating an example system that includes a plurality of driver devices configured to collectively drive a load with a power signal, in accordance with one or more exemplary techniques of this disclosure.

FIG. 2 is a conceptual diagram illustrating an example system that includes a plurality of driver devices configured to collectively drive a load with a power signal, in accordance with one or more exemplary techniques of this disclosure. As illustrated in FIG. 2, system 1E includes a driver device 3 and additional driver devices 5A-5N (collectively, "additional driver devices 5") that are configured to collectively drive a load 6 with a power signal.

In some examples, system 1E may include additional driver devices 5, which may be configured to perform operations similar to driver device 3. For instance, additional driver devices 5 may be configured to control the amount of power provided to load 6 from a power source that supplies power signal $V_s$.

As discussed above, it may be desirable to reduce the amount of power dissipated in driver circuits, such as driver device 3 (e.g., to reduce the amount of power dissipated by the driver circuit in the "worst case"). In accordance with one or more techniques of this disclosure, the amount of power dissipated in driver device 3 may be reduced through the use of one or more additional driver devices 5 in parallel with driver device 3. For instance, in the example of FIG. 2, the amount of power dissipated in driver device 3 may reduced in proportion to the number of driver devices included in additional driver devices 5. As one example, if additional driver devices 5 includes three driver devices, the amount of power dissipated in the driver circuit may be reduced by one-quarter (25%).

However, in some examples, it may not be desirable to use additional driver devices 5 in parallel with driver device 3 to reduce the amount of power dissipated in driver device 3. As one example, the use of additional driver devices 5 may increase a cost of system 1E. As another example, the use of additional driver devices 5 may require extra design effort.

Figure 3:
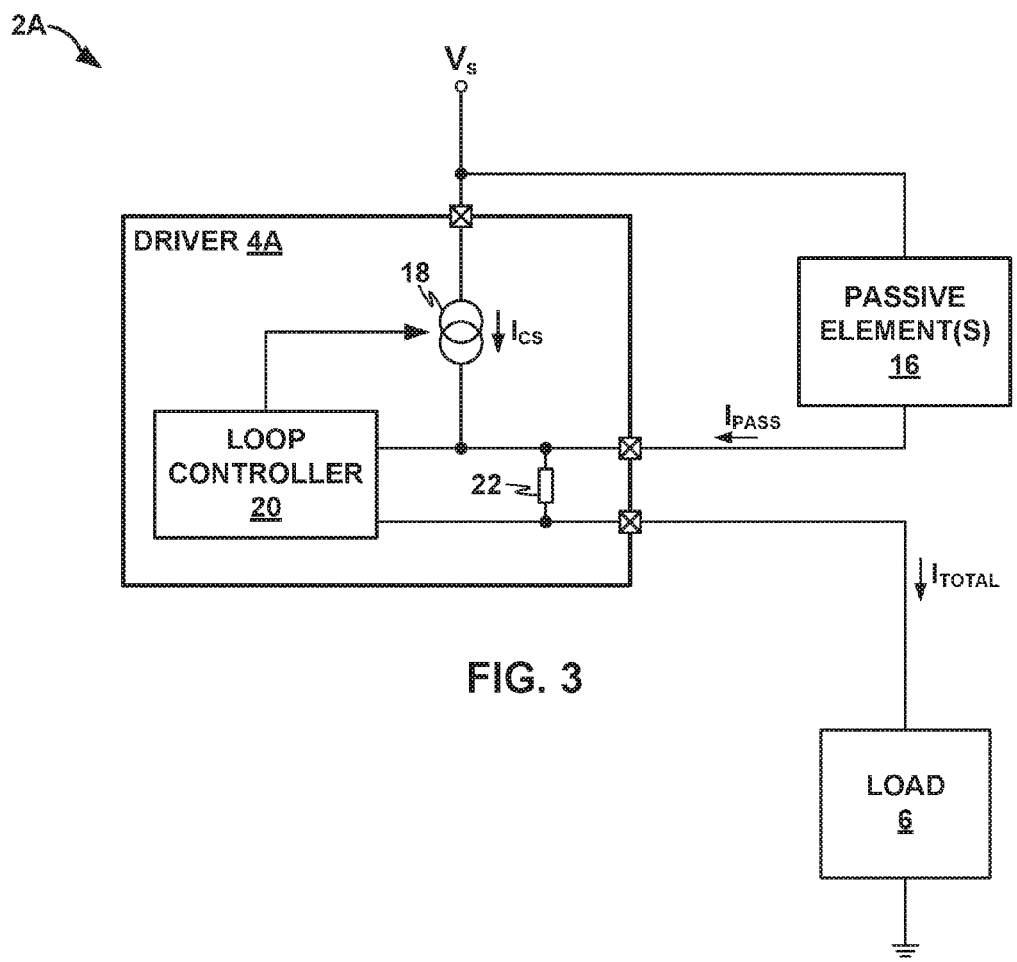
FIG. 3 is a conceptual diagram illustrating an example system that includes a driver device and one or more passive elements configured to collectively drive a load with a power signal, in accordance with one or more exemplary techniques of this disclosure.

FIG. 3 is a conceptual diagram illustrating an example system that includes a driver device and one or more passive elements configured to collectively drive a load with a power signal, in accordance with one or more exemplary techniques of this disclosure. As illustrated in FIG. 3, system 2A may include driver device 4A, load 6, and one or more passive elements 16.

In some examples, system 2A may include driver device 4A, which may be configured to control and amount of power provided to a load. For instance, driver device 4A may be configured to generate a portion of a power signal that drives load 6. As shown in FIG. 3, driver 4A may include current source 18, loop controller 20, shunt 22, and connectors 24A-24C (collectively, "connectors 24"). In some examples, such as the example of FIG. 3, driver device 4A may be a high-side driver with respect to load 6. In some examples, such as the example of FIG. 4, driver device 4A may be a low-side driver with respect to load 6.

In some examples, driver device 4A may include current source 18, which may be configured to generate a power signal. For instance, current source 18 may generate a power signal with current level $I_{CS}$, which may be a portion of the power signal that drives load 6. In some examples, the current level of the power signal generated by current source 18 may be set by one or more other components, such as loop controller 20. In some examples, current source 18 may be a linear current source.

As discussed above, while it may be generally desirable to reduce the power dissipated by driver devices, it may not be desirable to achieve the reduction in power dissipation through the use of additional driver devices in parallel or the use of passive components in series with the driver devices. In accordance with one or more techniques of this disclosure, system 2A may include, one or more passive elements 16 that are positioned in parallel to driver device 4A and may be configured to generate a portion of a power signal that drives load 6. For instance, current source 18 may generate a first portion of a power signal that drives load 6 with a first current level (i.e., $I_{CS}$) and one or more passive elements 16 may generate a second portion of the power signal that drives load 6 with a second current level (i.e., $I_{Pass}$). The first portion of the power signal and the second portion of the power signal may be combined to create a total power signal that drives load 6 and has a current level (i.e., $I_{Total}$) that is a sum of the first current level and the second current level. As all of the current of the power signal is not flowing through current source 18 (e.g., because a portion of the current of the power signal is flowing through passive elements 16 in parallel to current source 18), the amount of power dissipated by current source 18 may be reduced.

In some examples, passive elements 16 may include one or more resistors and the current level of the portion of the power signal generated by passive elements 16 may be determined in accordance with Equation (5), where $I_{Pass}$ is the current level of the portion of the power signal generated by passive elements 16, $V_{Pass}$ is the voltage across passive elements 16, and $R_{Pass}$ is the resistance of passive elements 16.

$$I_{Pass} = \frac{V_{Pass}}{R_{Pass}} \qquad (5)$$

As discussed above, in some examples, the power source that supplies driver device 4A may be a variable power source, such as a battery with an operating voltage range of 8V to 18V. In some examples, the current level of the second portion of the power signal generated by passive elements 16 may be proportional to the voltage of the power source (i.e., $V_s$). For instance, the current level of the second portion of the power signal generated by passive elements 16 may increase as the voltage of the power source increases. However, in some examples, it may be desirable for the current level of the overall power signal (i.e., $I_{Total}$) to be independent of the voltage of the power source.

In accordance with one or more techniques of this disclosure, in some examples, driver device 4A may include loop controller 20, which may be configured to adjust a current level of the power signal generated by current source 18. In some examples, loop controller 20 may adjust the current level of the power signal generated by current source 18 based on a current level of the power signal generated by passive elements 16. For instance, loop controller 20 may adjust the current level of the power signal generated by current source 18 (i.e., $I_{CS}$) based on a current level of the power signal generated by passive elements 16 (i.e., $I_{Pass}$) such that a total current level of the power signal that drives load 6 (i.e., $I_{Total}$) is maintained at a particular current level. In this way, loop controller 20 may enable the current level of the overall power signal (i.e., $I_{Total}$) to be independent of the voltage of the power source.

As discussed above, it may be desirable to selectively activate/deactivate a load, such as load 6, being driven by a driver device, such as driver 4A or 4B without deactivating the driver device (e.g., without disconnecting or decoupling the driver device from a power source). In some examples, loop controller 20 may selectively activate/deactivate current source 18 in order to activate/deactivate load 6. However, in some examples, simply activating/deactivating current source 18 may be insufficient to activate/deactivate load 6. For instance, in the example of FIG. 3 where a portion of the power signal that drives load 6 is generated by passive elements 16, simply activating/deactivating current source 18 may be insufficient to activate/deactivate load 6 because load 6 may still receive power from passive elements 16 even where current source 18 is deactivated.

In accordance with one or more techniques of this disclosure, driver device 4B may be configured to selectively activate/deactivate load 6 by both selectively preventing current source 18 from generating the first portion of the power signal and selectively preventing passive elements 16 from generating the second portion of the power signal. In some examples, driver device 4B may selectively prevent passive elements 16 from generating the second portion of the power signal by opening/closing a switch positioned in series with passive elements 16. As such, in some examples, driver device 4B may include a control terminal via which driver device 4B may output a signal to selectively prevent passive elements 16 from generating the second portion of the power signal. Further details of some example driver devices that may selectively prevent passive elements from generating the second portion of the power signal are discussed below with reference to FIGS. 5 and 6.

Figure 5:
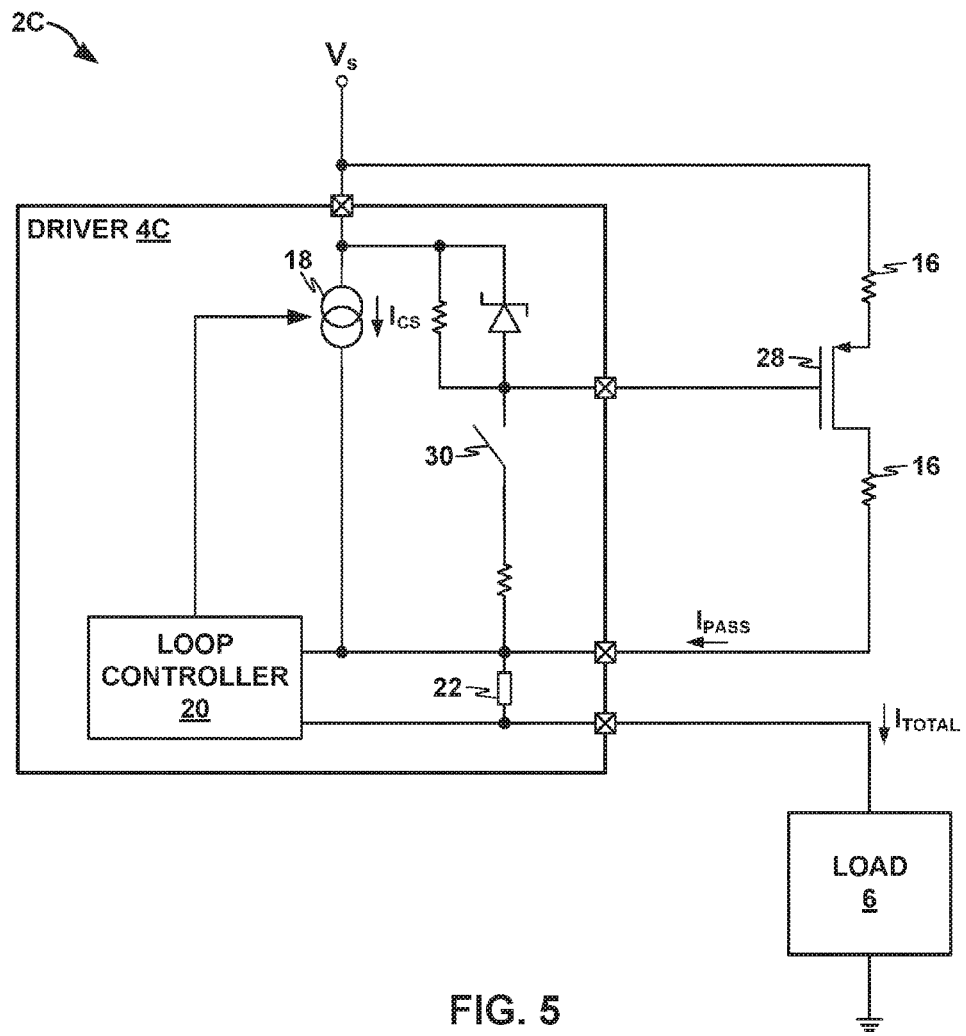
FIG. 5 is a conceptual diagram illustrating an example system that includes a driver device and one or more passive elements configured to collectively drive a load with a power signal, in accordance with one or more exemplary techniques of this disclosure.

FIG. 5 is a conceptual diagram illustrating an example system 4C that includes a driver device and one or more passive elements configured to collectively drive a load with a power signal, in accordance with one or more exemplary techniques of this disclosure. As illustrated in FIG. 5, system 2C may include driver device 4C, load 6, switch 28, and one or more passive elements 16.

In some examples, system 2C may include driver device 4C, which may be configured to perform operations similar to driver device 4A of FIG. 3. For instance, driver device 4C may be configured to generate a portion of a power signal that drives load 6.

In accordance with one or more techniques of this disclosure, driver device 4C may be configured to selectively activate/deactivate load 6 by both selectively preventing current source 18 from generating the first portion of the power signal and selectively preventing passive elements 16 from generating the second portion of the power signal. In some examples, driver device 4C may selectively prevent passive elements 16 from generating the second portion of the power signal by opening/closing a switch positioned in series with passive elements 16, such as switch 28. As illustrated in FIG. 5, switch 28 may include a PMOS switch.

In one example operation, switch 28 may be closed, driver 4C may generate a first portion of a power signal used to drive load 6 and passive elements 16 may generate a second portion of the power signal. Driver 4C may receive a control signal from an external device, such as a microcontroller, that causes driver 4C to deactivate load 6. In response to the control signal, loop controller 20 may prevent current source 18 from generating the first portion of the power signal and switch 30 may open. The opening of switch 30 may cause switch 28 to cease allowing current to flow through passive elements 16. In this way, driver device 4C may be configured to selectively activate/deactivate load 6 without being disconnected or decoupled from $V_s$.

Figure 6:
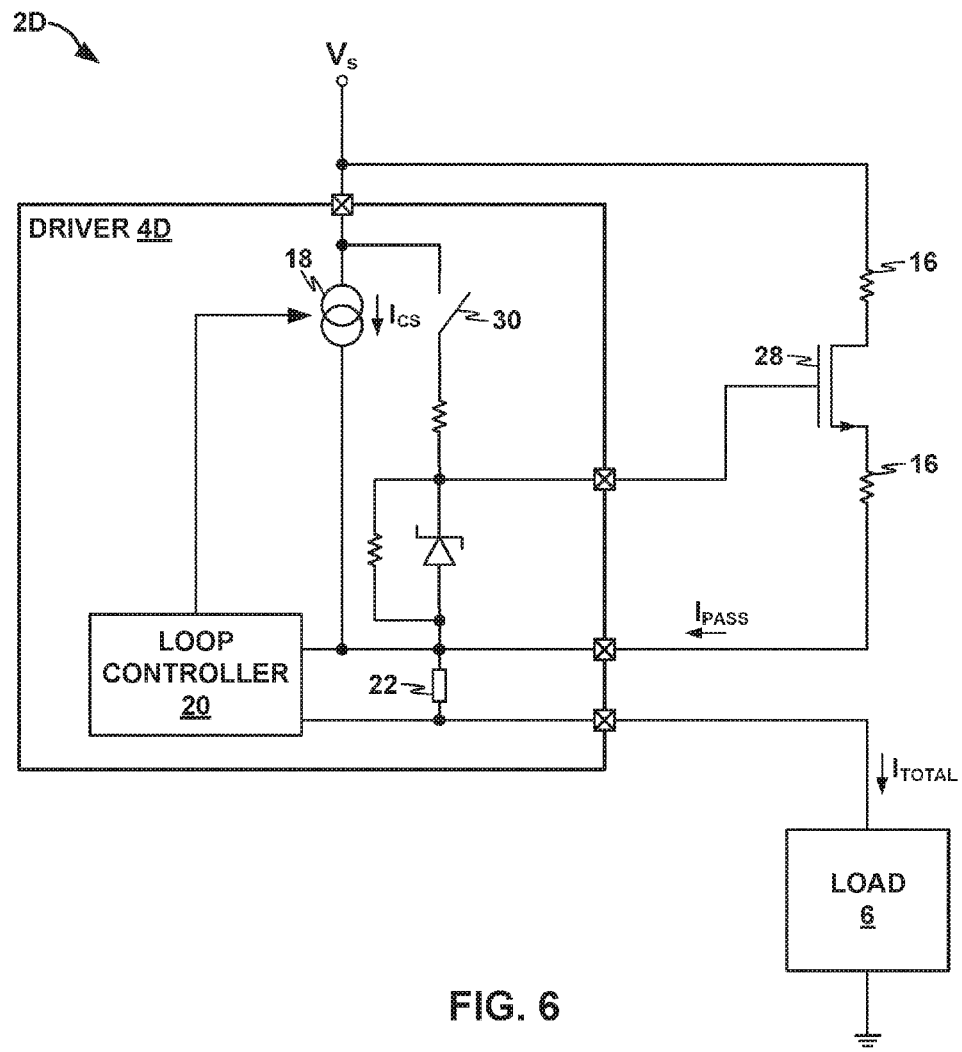
FIG. 6 is a conceptual diagram illustrating an example system that includes a driver device and one or more passive elements configured to collectively drive a load with a power signal, in accordance with one or more exemplary techniques of this disclosure.

FIG. 6 is a conceptual diagram illustrating an example system 4D that includes a driver device and one or more passive elements configured to collectively drive a load with a power signal, in accordance with one or more exemplary techniques of this disclosure. As illustrated in FIG. 6, system 2D may include driver device 4D, load 6, switch 28, and one or more passive elements 16. However, as opposed to the example of FIG. 5 where switch 28 is illustrated as a PMOS switch, FIG. 6 illustrates an example where switch 28 includes an NMOS switch. In some examples, the use of an NMOS switch may be desirable over a PMOS switch. For instance, NMOS switches may be cheaper than PMOS switches.

Figure 4:
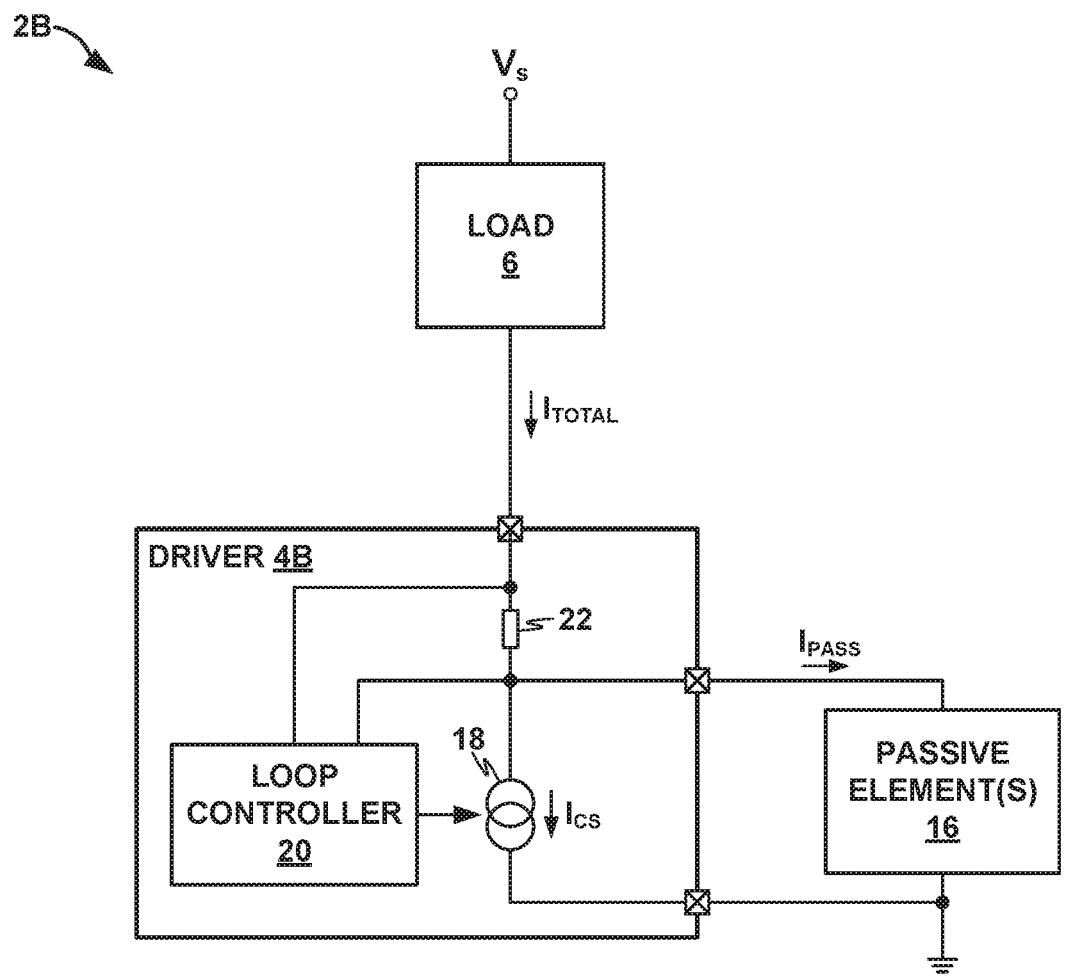
FIG. 4 is a conceptual diagram illustrating an example system that includes a driver device and one or more passive elements configured to collectively drive a load with a power signal, in accordance with one or more exemplary techniques of this disclosure.

In some examples, system 2D may include driver device 4D, which may be configured to perform operations similar to driver device 4C of FIG. 4. For instance, driver device 4D may be configured to selectively activate/deactivate load 6 by both selectively preventing current source 18 from generating the first portion of the power signal and selectively preventing passive elements 16 from generating the second portion of the power signal. However, as opposed to driver device 4C which is configured to operate switch 28 as a PMOS switch, driver device 4D is configured to operate switch 28 as an NMOS switch.

Referring to both FIGS. 5 and 6, the resistances the resistors included in passive elements 16 may be selected to minimize the power dissipated by switch 28. Specifically, if the resistances the resistors included in passive elements 16 are properly dimensioned, the power dissipated by switch 28 may be negligible in nearly all conditions (i.e., operative), especially if the conductance of switch 28 (gm) is high at low gate-source voltage ($V_{gs}$) levels. As such, in some examples, switch 28 may comprise a relatively high-ohmic MOS in a small non-exposed package. For instance, in examples where load 6 includes LEDs used on the rear of an automobile, switch 28 may comprise a relatively high-ohmic MOS in a small non-exposed package while still complying with a typical power budget for the rear light LED arena.

Figure 7:
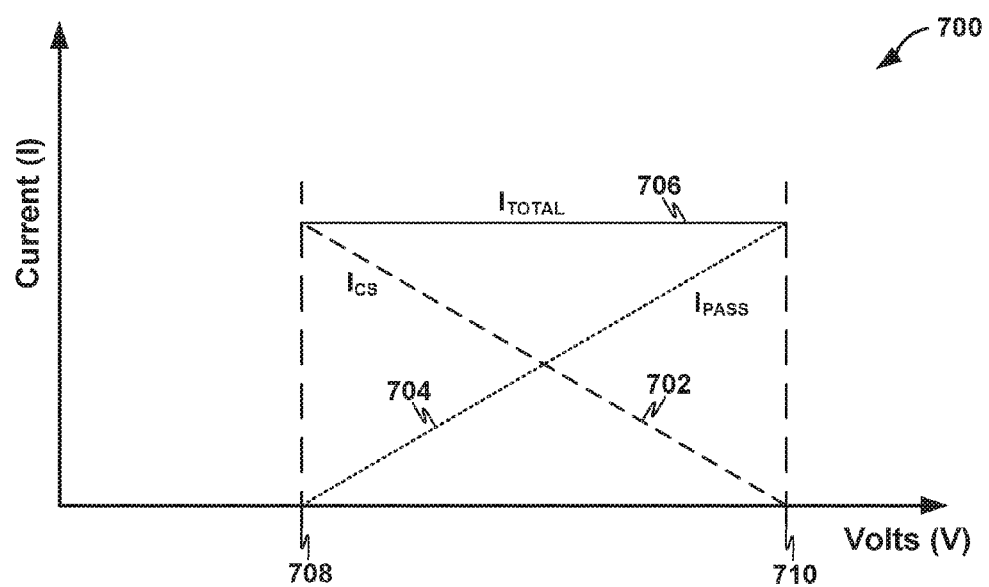
FIG. 7 is a graph illustrating example current levels in a system that includes a driver device and one or more passive elements configured to collectively drive a load with a power signal, in accordance with one or more exemplary techniques of this disclosure.

FIG. 7 is a graph 700 illustrating example current levels in a system that includes a driver device and one or more passive elements configured to collectively drive a load with a power signal, in accordance with one or more exemplary techniques of this disclosure. As illustrated in FIG. 7, graph 700 includes a horizontal x-axis indicating a voltage level, a vertical y-axis indicating a current level, first plot 702 representing a first voltage/current relationship, second plot 704 representing a second voltage/current relationship, and third plot 706 representing a third voltage/current relationship. In some examples, first plot 702 may represent the voltage/current relationship for the first portion of the power signal generated by current source 18 of driver device 4 of system 2 of FIGS. 3-6 (i.e., $I_{CS}$), second plot 704 may represent the voltage/current relationship for the second portion of the power signal generated by passive elements 16 of system 2 of FIGS. 3-6 (i.e., $I_{Pass}$), and third plot 706 may represent the voltage/current relationship for the total power signal used to drive load 6 of system 2 of FIGS. 3-6 (i.e., $I_{Total}$).

As discussed above, it may be desirable for the current level of the overall power signal (i.e., $I_{Total}$) to be independent of the voltage of the power source. In accordance with one or more techniques of this disclosure, loop controller 20 of driver device 4 may adjust a current level of the power signal generated by current source 18 (i.e., $I_{CS}$) based on a current level of the power signal generated by passive elements 16 (i.e., $I_{Pass}$) such that a total current level of the power signal that drives load 6 (i.e., $I_{Total}$) is maintained at a particular current level. As shown by graph 700, as the current level of the power signal generated by passive elements 16 (i.e., $I_{Pass}$) changes, loop controller 20 may adjust the current level of the power signal generated by current source 18 (i.e., $I_{CS}$) such that the total current level of the power signal that drives load 6 (i.e., $I_{Total}$) is maintained at a particular current level.

In some examples, loop controller 20 may perform the adjustment such that the total current level of the power signal that drives load 6 (i.e., $I_{Total}$) is maintained at a particular current level within a particular voltage range. For instance, where load 6 comprises one or more LEDs that have a forward activation voltage level (i.e., $V_{fLED}$) 708 and a voltage level of the power source of driver device 4 (i.e., $V_s$) is voltage level 710, loop controller 20 may perform the adjustment such that the total current level of the power signal that drives load 6 (i.e., $I_{Total}$) is maintained between voltage level 708 and voltage level 710. In this way, loop controller 20 may enable the current level of the overall power signal (i.e., $I_{Total}$) to be independent of the voltage of the power source across the entire operational range of load 6.

Figure 8:
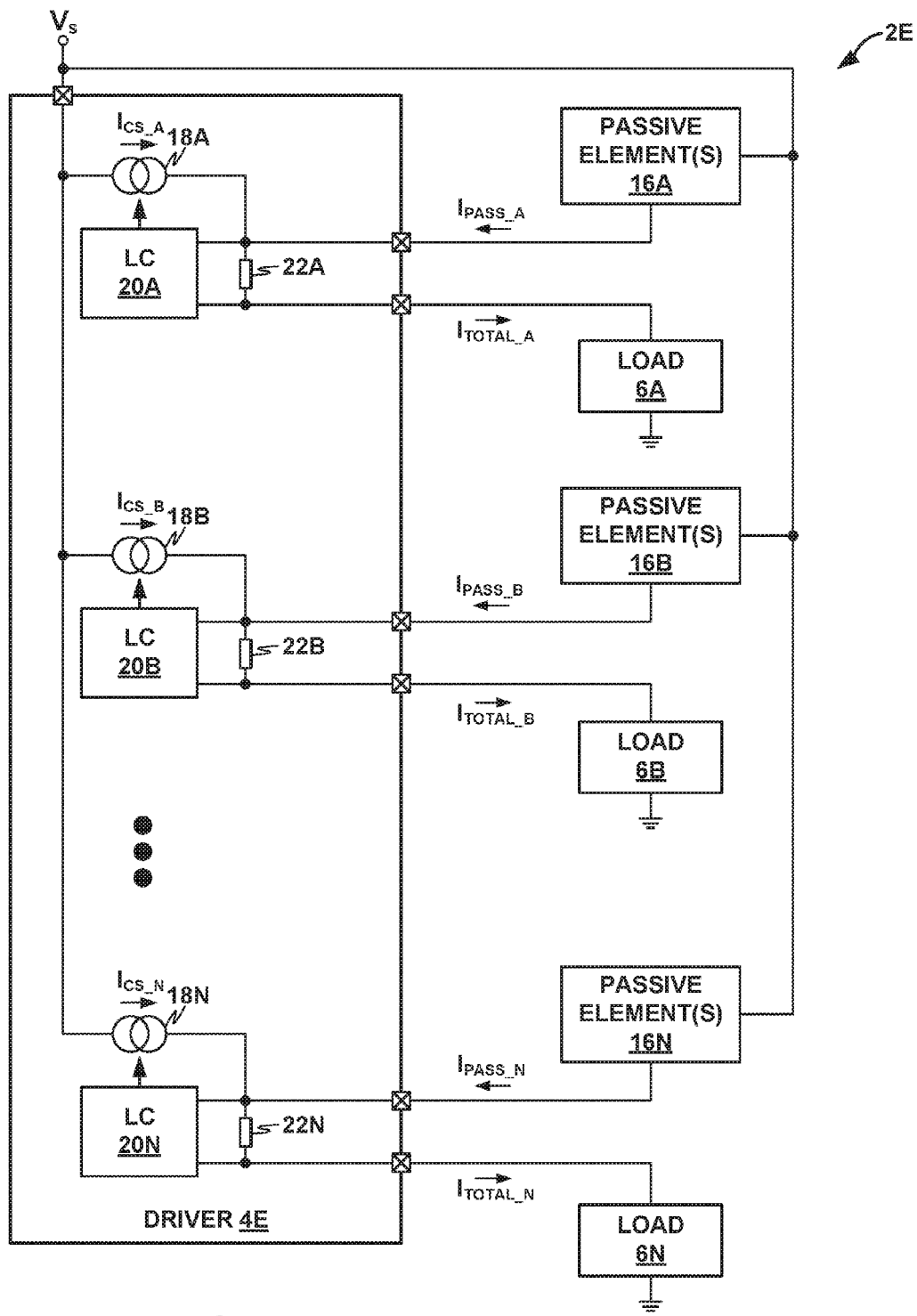
FIG. 8 is a conceptual diagram illustrating an example system that includes a multi-channel driver device and a plurality of passive elements configured to collectively drive a plurality of loads with a plurality of power signals, in accordance with one or more exemplary techniques of this disclosure.

FIG. 8 is a conceptual diagram illustrating an example system 2E that includes a multi-channel driver device and a plurality of passive elements configured to collectively drive a plurality of loads with a plurality of power signals, in accordance with one or more exemplary techniques of this disclosure. As illustrated in FIG. 8, system 2E may include driver device 4E, one or more loads 6A-6N (collectively, "loads 6"), and one or more sets of passive elements 16A-16N (collectively, "passive element sets 16").

In some examples, system 2E may include driver device 4E, which may be configured to perform operations similar to driver device 4A of FIG. 3, driver device 4B of FIG. 4, driver device 4C of FIG. 5, and/or driver device 4D of FIG. 6. For instance, driver device 4E may be configured to generate a portion of a power signal that drives a load. However, as shown in FIG. 8, driver device 4E may be a multi-channel driver device which may simultaneously generate respective portions of respective power signals that each drive a respective load of loads 6. For instance, each of current sources 18A-18N (collectively "current sources 18") may generate a respective first portion of a respective power signal that drives a respective load of loads 6. Similarly, each of passive element sets 16 may generate a respective second portion of a respective power signal that drives a respective load of loads 6. As one example, current source 18A may generate a first portion of a power signal with current level $I_{CS\_A}$, passive elements 16A may generate a second portion of the power signal with current level $I_{PASS\_A}$, and the first and second portions of the power signal may be combined to generate a total power signal with current level $I_{Total\_A}$ that drives load 6A. As another example, current source 18B may generate a first portion of a power signal with current level $I_{CS\_B}$, passive elements 16B may generate a second portion of the power signal with current level $I_{PASS\_B}$, and the first and second portions of the power signal may be combined to generate a total power signal with current level $I_{Total\_B}$ that drives load 6B.

In accordance with one or more techniques of this disclosure, driver device 4E may be configured to selectively activate/deactivate loads 6 by both selectively preventing current sources 18 from generating respective first portions of the power signals and selectively preventing respective passive elements of passive elements 16A-16N from generating respective second portions of the power signals.

Figure 9:
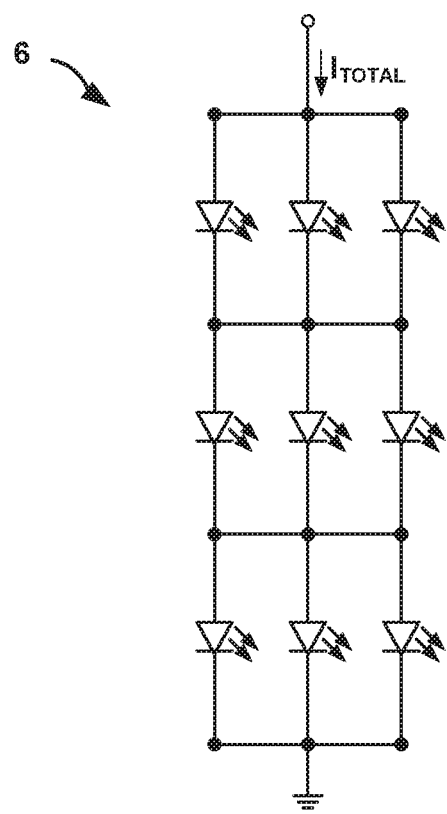
FIG. 9 is a schematic diagram illustrating an example load 6 that may be driven using a power signal generated by a driver device and one or more passive elements in parallel with the driver device, in accordance with one or more techniques of this disclosure.

FIG. 9 is a schematic diagram illustrating an example load 6 that may be driven using a power signal generated by a driver device and one or more passive elements in parallel with the driver device, in accordance with one or more techniques of this disclosure. As discussed above, load 6 may include one or more LEDs located on an automobile (e.g., headlights, fowlights, tail-lights, reverse lights, brake lights, turn signals, and the like). In some examples, it may be desirable to drive a more than one LED with a single driver device. For instance, as shown in the example of FIG. 8, load 6 may include an array of LEDs. In examples where load 6 includes a plurality of LEDs (in an array, in series, in parallel), the current requirements of load 6 may increase as compared to examples where load 6 includes a single LED. As the current requirements of load 6 increase, the power dissipated by the driver device, such as driver device 4, may correspondingly increase. As discussed above and in accordance with one or more techniques of this disclosure, the power dissipation of a current source of a driver device may be reduced through the use of one or more passive elements in parallel with the current source that generate a portion of the power signal used to drive the load.

Figure 10:
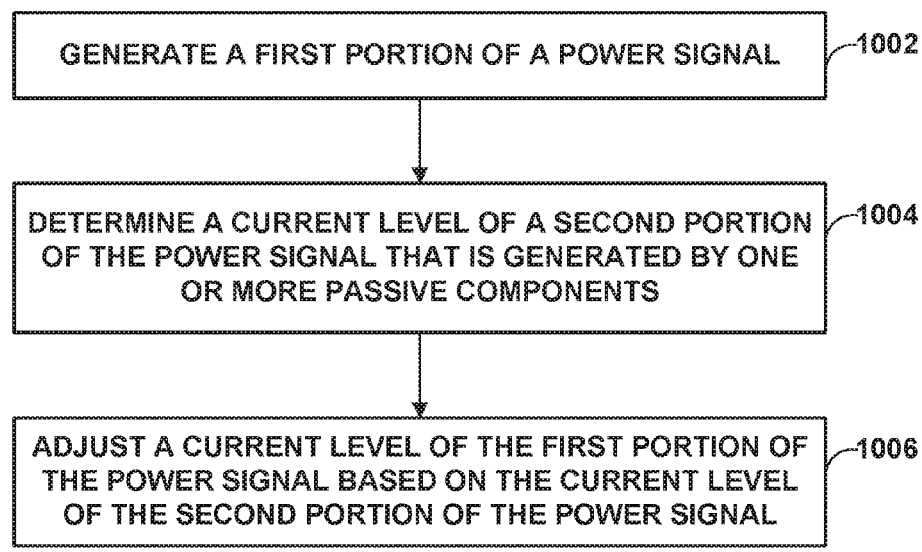
FIG. 10 is a flow diagram illustrating an example technique reducing the power dissipation of a driver device, in accordance with one or more techniques of this disclosure.

FIG. 10 is a flow diagram illustrating an example technique reducing the power dissipation of a driver device, in accordance with one or more techniques of this disclosure. For purposes of illustration only, the example operations are described below within the context of driver device 4, as shown in FIGS. 3-6, though driver devices other than driver device 4 may perform the techniques of FIG. 10.

In accordance with one or more techniques of this disclosure, driver device 4 may generate a first portion of a power signal (1002). For instance, current source 18 of driver device 4 may generate a portion of a power signal that drives load 6. In some examples, the current level of the portion of the power signal that is generated by current source 18 may be denoted as $I_{CS}$.

Driver device 4 may determine a current level of a second portion of the power signal that is generated by one or more passive components (1004). For instance, loop controller 20 of driver device 4 may determine a current level of a portion of the power signal that is generated by passive elements 16 of FIGS. 3-6. In some examples, loop controller 20 may determine the current level of the portion of the power signal that is generated by passive elements 16 based on a voltage across a sense resistor, such as shunt 22. In some examples, the sense resistor may be included within driver device 4. In some example, the sense resistor may be external to driver device 4. In some examples, the current level of the portion of the power signal that is generated by passive components 16 may be denoted as $I_{Pass}$.

Driver device 4 may adjust a current level of the first portion of the power signal based on the current level of the second portion of the power signal (1006). For instance, loop controller 20 may adjust a current level of the power signal generated by current source 18 (i.e., $I_{CS}$) based on the current level of the power signal generated by passive elements 16 (i.e., $I_{Pass}$) such that a total current level of the power signal that drives load 6 (i.e., $I_{Total}$) is maintained at a particular current level. In this way, the power dissipation of driver device 4 may be reduced without changing the characteristics (i.e., current level) of the the power signal that drives load 6.

The following numbered examples may illustrate one or more aspects of the disclosure:

Example 1

A method comprising: generating, by a current source of a device, a first portion of a power signal that drives one or more load elements, wherein a second portion of the power signal is generated by one or more components that are external to the device and are in parallel to the current source such that the second portion of the power signal does not flow through the current source.

Example 2

The method of example 1, further comprising: adjusting, by the device and based on a current level of the second portion of the power signal, a current level of the first portion of the power signal to maintain a total current level of the power signal.

Example 3

The method of any combination of examples 1-2, further comprising: preventing, based on a control signal received from an external device, the current source from generating the first portion of the power signal and the one or more components from generating the second portion of the power signal.

Example 4

The method of any combination of examples 1-3, wherein preventing the one or more components from generating the second portion of the power signal comprises: opening a switch positioned in series with the one or more components.

Example 5

The method of any combination of examples 1-4, wherein the one or more components are not active current sources.

Example 6

The method of any combination of examples 1-5, wherein the one or more components comprise one or more resistors.

Example 7

The method of any combination of examples 1-6, wherein the one or more load elements comprise one or more light emitting diodes (LEDs).

Example 8

A driver device comprising: a current source configured to generate a first portion of a power signal that drives one or more load elements, wherein a second portion of the power signal is generated by one or more components that are external to the device and are in parallel to the current source such that the second portion of the power signal does not flow through the current source.

Example 9

The driver device of example 8, further comprising: a loop controller configured to adjust, based on a current level of the second portion of the power signal, a current level of the first portion of the power signal to maintain a total current level of the power signal.

Example 10

The driver device of any combination of examples 8-9, wherein, based on a control signal received from an external device, the loop controller is configured to prevent the current source from generating the first portion of the power signal and prevent the one or more components from generating the second portion of the power signal.

Example 11

The driver device of any combination of examples 8-10, wherein, to prevent the one or more components from generating the second portion of the power signal, the loop controller is configured to: open a switch positioned in series with the one or more components.

Example 12

The driver device of any combination of examples 8-11, wherein the one or more components are not active current sources.

Example 13

The driver device of any combination of examples 8-12, wherein the one or more components comprise one or more resistors.

Example 14

The driver device of any combination of examples 8-13, wherein the one or more load elements comprise one or more light emitting diodes (LEDs).

Example 15

A driver device comprising: means for generating a first portion of a power signal that drives one or more load elements, wherein a second portion of the power signal is generated by one or more components that are external to the device and are in parallel to the current source such that the second portion of the power signal does not flow through the current source; and means for outputting the first portion of the power signal.

Example 16

The driver device of example 15, further comprising: means for adjusting, based on a current level of the second portion of the power signal, a current level of the first portion of the power signal to maintain a total current level of the power signal.

Example 17

The driver device of any combination of examples 15-16, further comprising: means for combining the first portion and the second portion to generate the power signal, wherein the means for outputting comprise means for outputting the power signal.

Example 18

The driver device of any combination of examples 15-17, further comprising: means for preventing, based on a control signal received from an external device, the means for generating from generating the first portion of the power signal and the one or more components from generating the second portion of the power signal.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects have been described in this disclosure. These and other aspects are within the scope of the following claims.

The invention claimed is:

1. A method comprising:
generating, by a current source of a device, a first portion of a power signal that drives one or more load elements, wherein a second portion of the power signal is generated by one or more components that are external to the device and are in parallel to the current source such that the second portion of the power signal does not flow through the current source that generated the first portion of the power signal and the first portion of the power signal does not flow through the one or more components that generated the second portion of the power signal.

2. The method of claim 1, further comprising:
adjusting, by the device and based on a current level of the second portion of the power signal, a current level of the first portion of the power signal to maintain a total current level of the power signal.

3. The method of claim 1, further comprising:
preventing, based on a control signal received from an external device, the current source from generating the first portion of the power signal and the one or more components from generating the second portion of the power signal.

4. The method of claim 3, wherein preventing the one or more components from generating the second portion of the power signal comprises:
opening a switch positioned in series with the one or more components.

5. The method of claim 3, wherein the one or more components are not active current sources.

6. The method of claim 1, wherein the one or more components comprise one or more resistors.

7. The method of claim 1, wherein the one or more load elements comprise one or more light emitting diodes (LEDs).

8. A driver device comprising:
a current source configured to generate a first portion of a power signal that drives one or more load elements, wherein a second portion of the power signal is generated by one or more components that are external to the device and are in parallel to the current source such that the second portion of the power signal does not flow through the current source that generated the first portion of the power signal and the first portion of the power signal does not flow through the one or more components that generated the second portion of the power signal.

9. The driver device of claim 8, further comprising:
a loop controller configured to adjust, based on a current level of the second portion of the power signal, a current level of the first portion of the power signal to maintain a total current level of the power signal.

10. The driver device of claim 8, wherein, based on a control signal received from an external device, the loop controller is configured to prevent the current source from generating the first portion of the power signal and prevent the one or more components from generating the second portion of the power signal.

11. The driver device of claim 10, wherein, to prevent the one or more components from generating the second portion of the power signal, the loop controller is configured to:
open a switch positioned in series with the one or more components.

12. The driver device of claim 10, wherein the one or more components are not active current sources.

13. The driver device of claim 8, wherein the one or more components comprise one or more resistors.

14. The driver device of claim 8, wherein the one or more load elements comprise one or more light emitting diodes (LEDs).

15. A driver device comprising:
means for generating a first portion of a power signal that drives one or more load elements, wherein a second portion of the power signal is generated by one or more components that are external to the device and are in parallel to the means for generating the first portion of the power signal such that the second portion of the power signal does not flow through the means for generating the first portion of the power signal and the first portion of the power signal does not flow through the one or more components that generated the second portion of the power signal; and
means for outputting the first portion of the power signal.

16. The driver device of claim 15, further comprising:
means for adjusting, based on a current level of the second portion of the power signal, a current level of the first portion of the power signal to maintain a total current level of the power signal.

17. The driver device of claim 16, further comprising:
means for combining the first portion and the second portion to generate the power signal, wherein the means for outputting comprise means for outputting the power signal.

18. The driver device of claim 15, further comprising:
means for preventing, based on a control signal received from an external device, the means for generating from generating the first portion of the power signal and the one or more components from generating the second portion of the power signal.

19. The method of claim 1, further comprising:
receiving, by the device and from the one or more components, the second portion of the power signal;
combining, by the device, the second portion of the power signal with the first portion of the power signal, wherein a total current level of the power signal is a combination of a current level of the first portion of the power signal and a current level of the second portion of the power signal.

* * * * *